United States Patent
Gergov et al.

(10) Patent No.: US 11,034,070 B2
(45) Date of Patent: Jun. 15, 2021

(54) REAL TIME MATERIAL AND VELOCITY CONTROL IN A MOLDING SYSTEM

(71) Applicant: IMFLUX INC., Hamilton, OH (US)

(72) Inventors: Milko Gergov, Ann Arbor, MI (US); Chow-Chi Huang, West Chester, OH (US); Steve Andrew Burns, Hamilton, OH (US); Rick Alan Pollard, Moscow, OH (US)

(73) Assignee: IMFLUX INC., Hamilton, OH (US)

( * ) Notice: Subject to any disclaimer, the term of this patent is extended or adjusted under 35 U.S.C. 154(b) by 166 days.

(21) Appl. No.: 16/123,542

(22) Filed: Sep. 6, 2018

(65) Prior Publication Data

US 2019/0105826 A1    Apr. 11, 2019

Related U.S. Application Data

(60) Provisional application No. 62/692,329, filed on Jun. 29, 2018, provisional application No. 62/568,548, (Continued)

(51) Int. Cl.
*B29C 45/77*    (2006.01)
*B29C 45/78*    (2006.01)
(Continued)

(52) U.S. Cl.
CPC ............ *B29C 45/77* (2013.01); *B29C 45/766* (2013.01); *B29C 45/768* (2013.01);
(Continued)

(58) Field of Classification Search
CPC .. B29C 2045/1795; B29C 2045/76006; B29C 2945/7604; B29C 2945/7606;
(Continued)

(56) References Cited

U.S. PATENT DOCUMENTS 3,840,312 A * 10/1974 Paulson ................ B29C 45/77
                                                    425/149
5,916,501 A    6/1999 Hehl
(Continued)

FOREIGN PATENT DOCUMENTS

DE    102005016617 B3    12/2006
DE    102015117237 B3    3/2017

OTHER PUBLICATIONS

Chen et al., Simulation of injection-compression-molding process. II. Influence of process characteristics on part shrinkage, J. Appl. Polymer Sci., 75(13):1640-54 (Mar. 2000).
(Continued)

*Primary Examiner* — Alexander M Weddle
(74) *Attorney, Agent, or Firm* — Marshall, Gerstein & Borun LLP (57) ABSTRACT

A system includes a cavity, an injection nozzle configured to inject material into the cavity, and a plurality of sensors at sensor locations. Each of the plurality of sensors is configured to measure parameters at one of the sensor locations. The system lacks a strain gauge. The system further includes a controller configured to control a flow rate of the injection of material into the cavity. The controller is configured to receive the measured parameters and compare the received information to predetermined curves. The controller is configured to control the flow rate when the measured parameters deviate from the predetermined curves.

8 Claims, 7 Drawing Sheets

Related U.S. Application Data filed on Oct. 5, 2017, provisional application No. 62/526,559, filed on Jun. 29, 2017.

(51) Int. Cl.
*B29C 45/76* (2006.01)
*B29C 45/17* (2006.01)

(52) U.S. Cl.
CPC ...... *B29C 45/7613* (2013.01); *B29C 45/7693* (2013.01); *B29C 45/78* (2013.01); *B29C 2045/1795* (2013.01); *B29C 2945/7604* (2013.01); *B29C 2945/7606* (2013.01); *B29C 2945/76006* (2013.01); *B29C 2945/7613* (2013.01); *B29C 2945/76107* (2013.01); *B29C 2945/76545* (2013.01); *B29C 2945/76591* (2013.01); *B29C 2945/76595* (2013.01); *B29C 2945/76933* (2013.01)

(58) Field of Classification Search
CPC .. B29C 2945/76107; B29C 2945/7613; B29C 2945/76545; B29C 2945/76591; B29C 2945/76595; B29C 2945/76933; B29C 45/7613; B29C 45/766; B29C 45/768; B29C 45/7693; B29C 45/77; B29C 45/78
See application file for complete search history.

(56) References Cited

U.S. PATENT DOCUMENTS

| | | |
|---|---|---|
| 5,997,778 A | 12/1999 | Bulgrin |
| 6,649,095 B2 | 11/2003 | Buja |
| 2004/0047935 A1 | 3/2004 | Moss et al. |
| 2009/0115086 A1 | 5/2009 | Manda |
| 2013/0255371 A1 | 10/2013 | Beaumont et al. |
| 2014/0200710 A1* | 7/2014 | Chang ................. G06F 30/23 700/197 |
| 2016/0332342 A1 | 11/2016 | Pillwein et al. |
| 2017/0015040 A1 | 1/2017 | Chang et al. |

OTHER PUBLICATIONS

Sheth et al., An adaptive control methodology for the injection molding process. Part 1: Material data generation, J. Injection Molding Technol., 2(2):86-94 (Jun. 1998).

Michaeli et al., Gezielte spritzgiess-machineneinstellung durch simulationsergebnisse, teil, I. Selective injection moulding machine setting using simulation results. Part 1, Plastverarbeiter, Huethig GMBH, Heidelberg, DE, 45(8): 30-34 (Aug. 1994).

European patent application No. 18180945.0, Extended European Search Report, dated Nov. 23, 2018.

International Search Report and Written Opinion, International Application No. PCT/US2018/049687, dated Jan. 7, 2019.

* cited by examiner

REAL TIME MATERIAL AND VELOCITY CONTROL IN A MOLDING SYSTEM

INCORPORATION BY REFERENCE OF EARLIER APPLICATION

U.S. Provisional Patent Application Nos. 62/526,559, filed Jun. 29, 2017, 62/568,548, filed Oct. 5, 2017, and 62/692,329, filed Jun. 29, 2018 are hereby incorporated by reference in their entireties.

FIELD OF INVENTION

This disclosure relates to the field of injection molding. More particularly, this disclosure relates to control of an injection material during an injection molding process.

BACKGROUND

Injection molding of parts includes injecting material into a mold, packing and cooling of the material in the mold to form the desired part, and ejecting the finished part from the mold. Control systems may employ feedback from temperature sensors, strain gauges, and other sensors to control the speed of a press, reciprocating screw, or other driving mechanism and thereby adjust the flow of the injection material. Such sensors may also be employed to detect malfunctions or irregularities, such as leakage of injection material. For example, prior systems may employ a sensor to detect a change in air flow or back pressure to detect leaks. Check rings with strain gauges have been used to sense such changes in the system.

SUMMARY

In one embodiment, a system includes a cavity, an injection nozzle configured to inject material into the cavity, and a plurality of sensors at sensor locations. Each of the plurality of sensors is configured to measure parameters at one of the sensor locations. The system lacks a strain gauge. The system further includes a controller configured to control a flow rate of the injection of material into the cavity. The controller is configured to receive the measured parameters and compare the received information to predetermined curves. The controller is configured to control the flow rate when the measured parameters deviate from the predetermined curves.

In another embodiment, a method of compensating for a leak in an injection molding device having a cavity and nozzle driving mechanism configured to inject injection material into the cavity is disclosed. The method includes providing a plurality of sensors at sensor locations, wherein each of the plurality of sensors is configured to sense and calculate a pressure, volume, and temperature of the injection material at the sensor locations. The method further includes calculating a weight and a mass of the injection material inside of the cavity during an injection process as a function of information received from the plurality of sensors. The method also includes adjusting a speed of the driving mechanism according to the calculated weight and mass of the injection material. The method further includes determining when the cavity has been filled by the injection material based on the calculated weight and mass of the injection material. The method also includes stopping the driving mechanism upon determining that the cavity has been filled.

In yet another embodiment, a method of compensating for a leak in an injection molding device having a cavity and nozzle driving mechanism configured to inject injection material into the cavity is disclosed. The method includes providing a plurality of sensors at sensor locations, wherein each of the plurality of sensors is configured to sense and calculate a pressure, volume, and temperature of the injection material at the sensor locations. The method further includes calculating a weight and a mass of the injection material inside of the cavity during an injection process as a function of information received from the plurality of sensors. The method also includes adjusting a speed of the driving mechanism according to the calculated weight and mass of the injection material. The method further includes determining when the cavity has been filled by the injection material based on the calculated weight and mass of the injection material, and stopping the driving mechanism upon determining that the cavity has been filled.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

In an injection molding system, it is desirable to measure or calculate parameters related to the weight and mass of injection material to recognize check ring leakage and compensate for such leaking. It is further desirable to make such measurements or calculations without the use of strain gauges. This may be done with statistical methods of controls that correlate machine variables with material and melt variables in order to measure and control the weight and mass displacement or leakage.

For example, if a material is injected at a constant velocity from point A to point B, and the inject signal to a valve controlling velocity is 5 Volts, one can calculate the respective weight and mass of material entering the cavity. But if this voltage changes, it indicates corresponding changes to viscosity, density, weight, or mass of the injection material.

Figure 1:
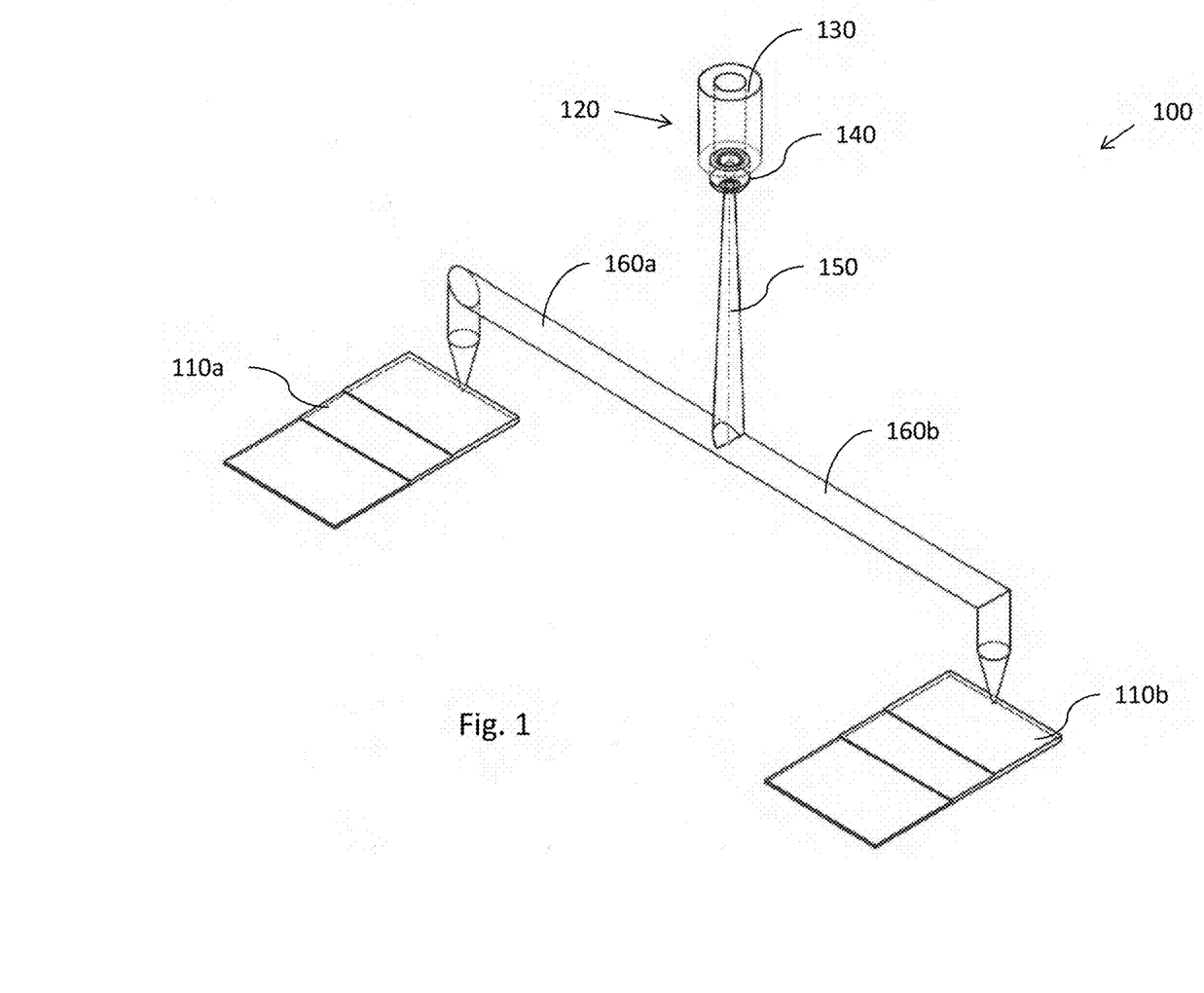
FIG. 1 is a perspective view of an exemplary injection molding device.

FIG. 1 is a simplified drawing illustrating an exemplary injection molding device 100. This figure is offered as an example of geometries in an injection molding device that affect the flow rate and other parameters of an injection molding process. It should be understood that any injection molding device may be employed with the disclosed system, including simpler or more complex devices.

In the illustrated embodiment, the injection molding device 100 is configured to fill a first mold 110a and a second mold 110b simultaneously. The injection molding device 100 includes a gate 120 having a large diameter portion 130 and a reduced diameter portion 140 that leads to a main passageway 150. The main passageway terminates at a first arm 160a and second arm 160b, each of which is orthogonal to the main passageway 150. The first arm 160a leads to a first exit nozzle 170a that is orthogonal to the first arm 160a and terminates at the first mold 110a. The second arm 160b leads to a second exit nozzle 170b that is orthogonal to the second arm 160b and terminates at the second mold 110b.

Injection material is forced through the injection molding device 100 using a press, reciprocating screw, or other driving mechanism (not shown). The injection material may be a thermoplastic material such as ABS, polypropylene, polyoxmethylene, polycarbonate, PVC, nylon, acrylic, styrene, polyether imide, or blends of the aforementioned material. In some examples, the injection material may be an expanding crosslinking polymer (e.g., ethylene-vinyl acetate or "EVA"). During injection of expanding crosslinking polymers, the polymer is heated to a temperature that is below an activation temperature of the polymer, or the temperature at which expansion and crosslinking within the polymer begins to occur. The injection material is then injected into the mold cavity, which is set to a temperature value high enough to activate a chemical reaction or reactions causing the polymer to begin expansion and crosslinking. The material is held under pressure to allow adequate crosslinking and expansion to occur, and the mold is subsequently ejected from the mold. It should be understood that these materials are merely exemplary and any injection material may be employed. The injection material may be provided in the form of thermoplastic pellets that are placed in a hopper (not shown). The thermoplastic pellets are then melted and forced through the gate 120 by the driving mechanism.

Sensors are employed at various locations on the injection molding device 100 or molds 110 to measure temperature and pressure inside the device. Sensors are also employed to measure the velocity of the injection material as it flows through the injection molding device 100 or molds 110. In one embodiment, sensors are located at the exit nozzles 170 and at the fill ends of the molds 110. However, sensors may be employed at any location. Additionally, the position and velocity of the driving mechanism is also measured by an encoder or other measuring device. The fill time and cooling time are also measured during the injection molding process.

Prior systems have attempted to optimize filling time and cooling time by relying on table data that relates a given measurement to adjustments in the speed of the driving mechanism or to other adjustments. In the presently disclosed system, real data is acquired from real time measurements and additional parameters are mathematically calculated. The real time measurements and calculated parameters are used to adjust the speed of the driving mechanism on the fly.

Figure 2:
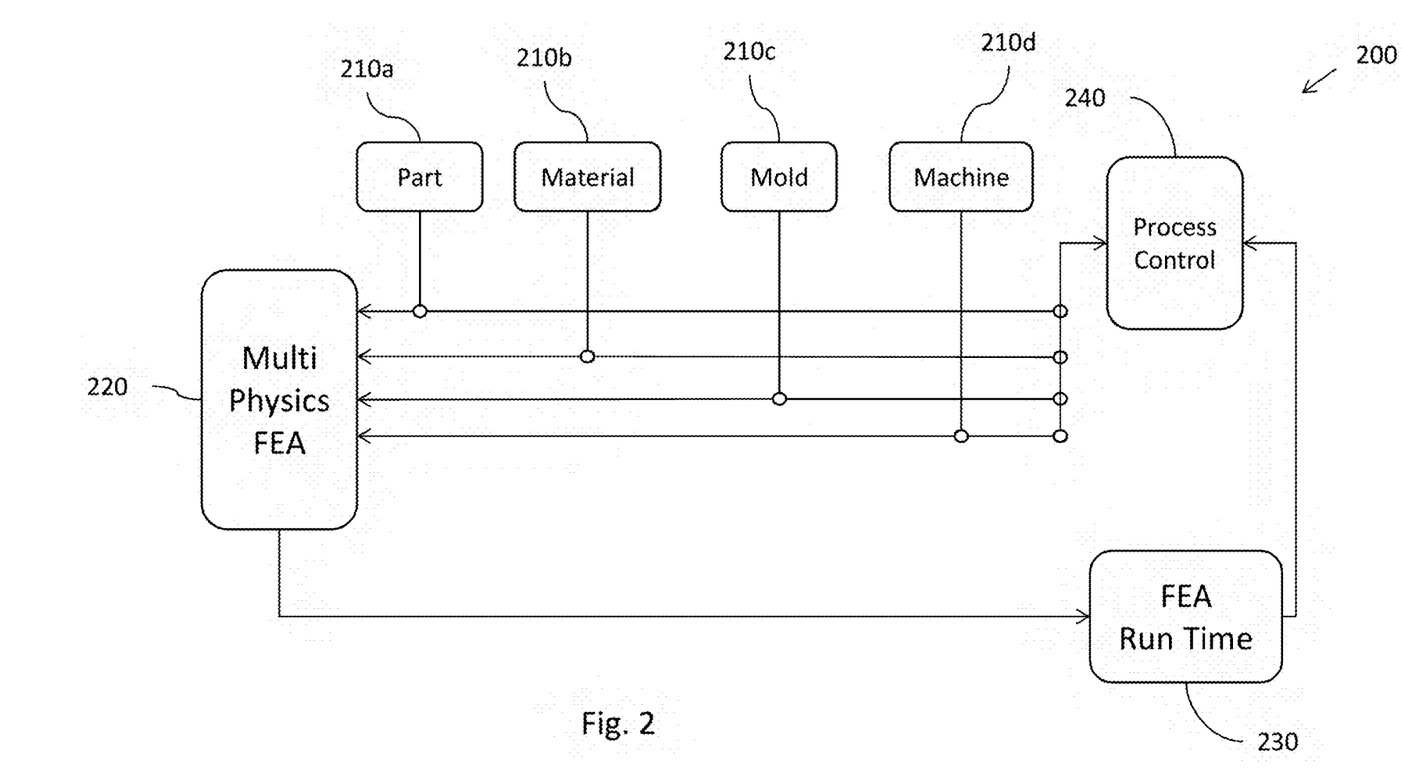
FIG. 2 is a schematic drawing showing the inputs and outputs of a modeling and molding system.

FIG. 2 is a schematic drawing showing the inputs and outputs of a modeling and molding system 200. In one embodiment, computerized models of the injection molding device 100 and molds 110 are built, and computerized simulations of the injection molding process are run to find optimal results in various conditions. The computerized simulations may also be used iteratively to adjust the initial parameters to further optimize the injection molding process. For example, a designer may select a different material composition for the injection material, change the initial temperature, change the geometry or material of the injection mold device, change the geometry or material of the molds, or change other parameters.

Sensor locations are identified during the building of the solid model. The sensor locations correspond to locations where physical sensors would be located in a physical mold. A single sensor location may be identified, or two or more sensor locations may be identified. In one embodiment, at least two sensor locations are identified, including a first location at a nozzle and a second location at an end of a fill location. However, it should be understood that any number of sensor locations may be employed.

After the sensor locations are identified, virtual sensors are placed in the solid model at the sensor locations. The virtual sensors are nodal points at which information is gathered during simulations.

With the resultant finite element model or other discretized solution domain defined, a user specifies boundary conditions for the analysis. The boundary conditions are parameters related to the object being molded, the material being used in the molding process, the mold itself, or the machine providing the material. More specifically, in an injection mold, the boundary conditions are parameters related to the part, the injection material, the injection mold, or the injection machine.

As can be seen in FIG. 2, a plurality of parameters 210 are input into a multi-physics FEA processor 220. The parameters 210 include part parameters 210a, material parameters 210b, mold parameters 210c, and machine parameters 210d.

Part parameters 210a include the estimated weight of the part, the heat transfer area of the part, nominal wall thickness, other part geometries, surface finish, and the minimum and maximum wall thickness of the part. Part parameters 210a may also include the final temperature at which the part is removed from the mold 110. The final temperature may be selected by the operator, or otherwise determined as the temperature at which the part maintains its shape.

Material parameters 210b include mass density, molar heat capacity, fluid composition, and thermal conductivity. The injection material may be a blend of multiple materials, each having different material properties. Each constituent material has a known mass density, molar heat capacity, and thermal conductivity. The material property of the resulting material may be determined from these constituent values and the weight percentage of the constituent materials.

Material parameters 210b may include table data stored in a database. Exemplary table data includes the data shown in Table 1 below. This data is merely exemplary, and is presented to illustrate the type of data that may be stored for various materials. As can be seen below, the material properties are shown for a given temperature or pressure, but those properties may change as the temperature and pressure changes. Thus, the table data may include data for a range of temperatures and pressures. Material characterization at the right places at the right time usable for monitoring and control in real time.

TABLE 1

| Material | Specific Gravity at 73° F. | Water Absorp. (%) at 73° F. | Tensile Strength (PSI) at 73° F. | Tensile Elongation (%) at 73° F. | Coeff. of Linear Thermal Expansion (in/in/° F. × $10^{-5}$) at 73° F. | Heat Deflection Temperature (° F.) at 66/264 psi | |
|---|---|---|---|---|---|---|---|
| ABS | 1.04 | 0.30 | 4,100 | 32 | 5.6 | 200 | 177 |
| Acrylic | 1.19 | 0.20 | 10,000 | 4.5 | 4.0 | — | 195 |

TABLE 1-continued

| Material | Specific Gravity at 73° F. | Water Absorp. (%) at 73° F. | Tensile Strength (PSI) at 73° F. | Tensile Elongation (%) at 73° F. | Coeff. of Linear Thermal Expansion (in/in/° F. × 10$^{-5}$) at 73° F. | Heat Deflection Temperature (° F.) at 66/264 psi | |
|---|---|---|---|---|---|---|---|
| Nylon | 1.14 | 1.20 | 12,400 | 90 | 4.5 | — | 194 |
| Polycarbonate | 1.20 | 0.15 | 9,500 | 135 | 3.8 | 280 | 270 |
| Polypropylene | 0.91 | slight | 5,400 | — | — | 210 | — |
| PVC | 1.42 | 0.06 | 7,500 | — | 3.2 | — | 158 |

Mold parameters 210c include mold temperature, cavity dimensions, cavity configuration, mold parting plane, the mold volume, the construction of the mold (e.g., the materials used to construct the mold, or the material properties of the mold), or heating or cooling assumptions related to the mold. Additional part parameters include any heating or cooling elements that aid in heat transfer.

Machine parameters 210d include the applied temperature, fluid injection location, fluid injection temperature, fluid injection pressure, fluid injection volumetric flow rate, and melt pressure. The operator may vary the temperature or vary the position or velocity of the driving mechanism to adjust the flow rate. Such variation may be performed on an intracycle basis; that is, during the same injection molding cycle from which the machine parameters were measured and/or obtained. The temperature may be measured both within the injection molding device 100 and within the mold 110.

Machine parameters 210d also include the geometry of the machine. As the injection material is forced through the injection molding device 100, the geometry of the injection molding device affects the flow rate of the injection material. For example, in the FIG. 1 embodiment the injection material experiences a shear force as it passes from the large diameter portion 130 to the reduced diameter portion 140 of the gate 120. This shear force affects the flow rate of the injection material. The initial impact of the injection material at the reduced diameter portion of the gate 120 may also cause a spike in pressure in the cavity, which may alter the viscosity of the injection material and further affecting the flow rate.

As the injection material passes through the main passageway 150, the arms 160, and the exit nozzles 170, the injection material experiences additional shears and changes in pressure, further affecting the flow rate of the injection material. Likewise, as the injection material experiences further shears and changes in pressure as it flows through the molds 110.

The injection material may also experience a change in temperature as it flows through the injection molding device 100 and the molds 110. The material may cool as it travels away from the heat source. However, friction may heat the material as it travels along its path. Such changes in temperature may affect the viscosity of the material and further affect the flow rate. These changes may be negligible, however. The change in temperatures may be mitigated or accelerated based on the heat conductivity of the materials selected for the injection molding device 100 and the molds 110, or with the use of heating or cooling elements along the pathway of the injection material.

The multi-physics FEA processor calculates additional parameters based on the part parameters 210a, material parameters 210b, mold parameters 210c, and machine parameters 210d. For example, the heat deflection temperature or heat distortion temperature (i.e., the temperature at which a polymer or plastic sample deforms under a specified load) may be determined from the material, machine, and mold parameters.

The multi-physics FEA also runs simulated injection molding processes and measures and calculates additional parameters during the simulations. The calculated parameters include, without limitation: the mass density of the injection material, the mass heat capacity of the injection material, the molar average heat capacity of the injection material, the molecular weight, the volume, the screw stroke, the relative viscosity, the absolute viscosity, the Reynold's number at a given location, the thermal conductivity of the injection material, the thermal diffusivity, the Prandtl at a given location, the relative shear, the relative shear rate, the melt flow index, the viscosity as a function of molecular weight, the viscosity as a function of shear, the mass as a function of shear rate, the determined stress as a function of position, the determined mass in the part as a function of position, the minimum and maximum polydispers in the part as a function of position, the theoretical cooling time, economics leading indicators, dynamic melt pressure, volumetric flow rate, bulk elastic modulus, flow velocity, Cauchy numbers, and density.

From these simulations, an optimal flow is determined by the multi-physics FEA processor 220, and pressure, volume, and temperature curves are created for the virtual sensor locations. Likewise, curves representing other data may also be generated. The curves may reflect measured data, calculated data, or retrieved data. For example, a temperature curve may reflect the temperature measured by sensors or virtual sensors. A curve representing material properties may reflect a table entry for a given property for a given material at the measured temperature. A curve representing relative shear may be calculated from measure data or table data using solvers.

The curves may be generated and read at run time 230, as the parameters are adjusted automatically on the fly. In another embodiment, the FEA calculations will be performed first, and the curves will be determined by reading the readings from the physical sensors and using the pre-calculated curves to determine what feed-forward profile to use for controlling the melt by pressure, screw velocity, or a combination profile to achieve the optimal plastic material flow.

The same parameters 210 are used in the process controls 240 of a molding system. As the molding system injects material into the cavity, the process controls 240 compare the pressure, volume, and temperature at sensor locations to the pressure, volume, and temperature curves. The pressure, volume, and temperature curves will be used in the actual molding operations to adjust the pressure, screw velocity, and temperature during the molding process so that the PVT readings of the physical sensors matches the PVT curves of the virtual sensors.

As one or more parameters change during the molding process, these changes affect other parameters. For example, an increase in temperature affects certain material properties, which in turn affects the volumetric flow rate of the material. Thus, during the molding process, the parameters are constantly monitored, measured, and re-calculated. By measuring and calculating these parameters in real time, the system provides feedback to the controller, which may then adjust other parameters (such as screw velocity) to finely control the molding process. Thus, the system may be characterized as having self-controlling injection capabilities during a single injection cycle (that is, on an intracycle basis).

The controller may employ machine learning or deep learning capabilities to control the molding process. In such an embodiment, while algorithms and solvers may be employed to calculate certain parameters, the controller employs machine learning techniques to read the real time inputs and make appropriate adjustments to the system.

When the system is used to simulate an injection molding process, data is recorded at each of the sensor locations. Such data recordation may be referred to as data capture by the virtual sensors in the solid model. Specifically, the pressure, volume, and temperature are recorded at the sensor locations during the simulation, so that pressure, volume, and temperature curves can be created. The pressure, volume, and temperature curves can represent the change of pressure, volume, and temperature over time or the change of pressure, volume, and temperature per unit of displacement of the injection material.

Upon completion of the analysis, the analytical results may be output in a variety of manners. For example, the relevant variables may be displayed in a graphics format, overlaying the solid model for visual review by the user, or may be output electronically for further processing or analysis. If the results of the filling phase and the packing phase are deemed to be acceptable, the simulation terminates and the user can proceed to release the design to manufacturing. Because the specified boundary conditions included information related to the configuration of the injection mold and the process parameters, the design can be released for machining of the injection mold and the injection molding process operation sheets generated directly. The pressure, volume, and temperature curves can also be released to an operator, for use with the physical mold during the molding process.

If, however, the user determines that the results of the simulation are unacceptable or less than optimal, the user has the option of modifying one or more of the boundary conditions or discretization of the model solution domain and thereafter repeating simulation iteratively, until such time as the user is satisfied with the results. Examples of unacceptable results include analytical instability of the model or process failures such as short shots, wherein the mold cavity is incompletely filled, or generation of excessive temperatures, velocities, or pressures during filling which could degrade component polymer material properties or introduce excessive residual stresses in the components which would adversely affect production yields and could lead to premature component failure. By providing this highly accurate analytical simulation capability early in the design process, significant costs and delays downstream during initial production runs can be avoided.

Alternatively, the analytical results may be fed directly into the multi-physics FEA processor, without displaying the results to an operator. The multi-physics FEA processor may review the analytical results in real time, or it may review the results after each simulation. The multi-physics FEA processor may adjust parameters on the fly, in the same manner described above, based on the measured and calculated parameters. Thus, the system provides a self-controlling injection simulation. Or after a simulation, the multi-physics FEA processor may review the results and suggest changes for a subsequent simulation. In either embodiment, the multi-physics FEA process may employ deep learning or machine learning capabilities to control the simulation.

Figure 3:
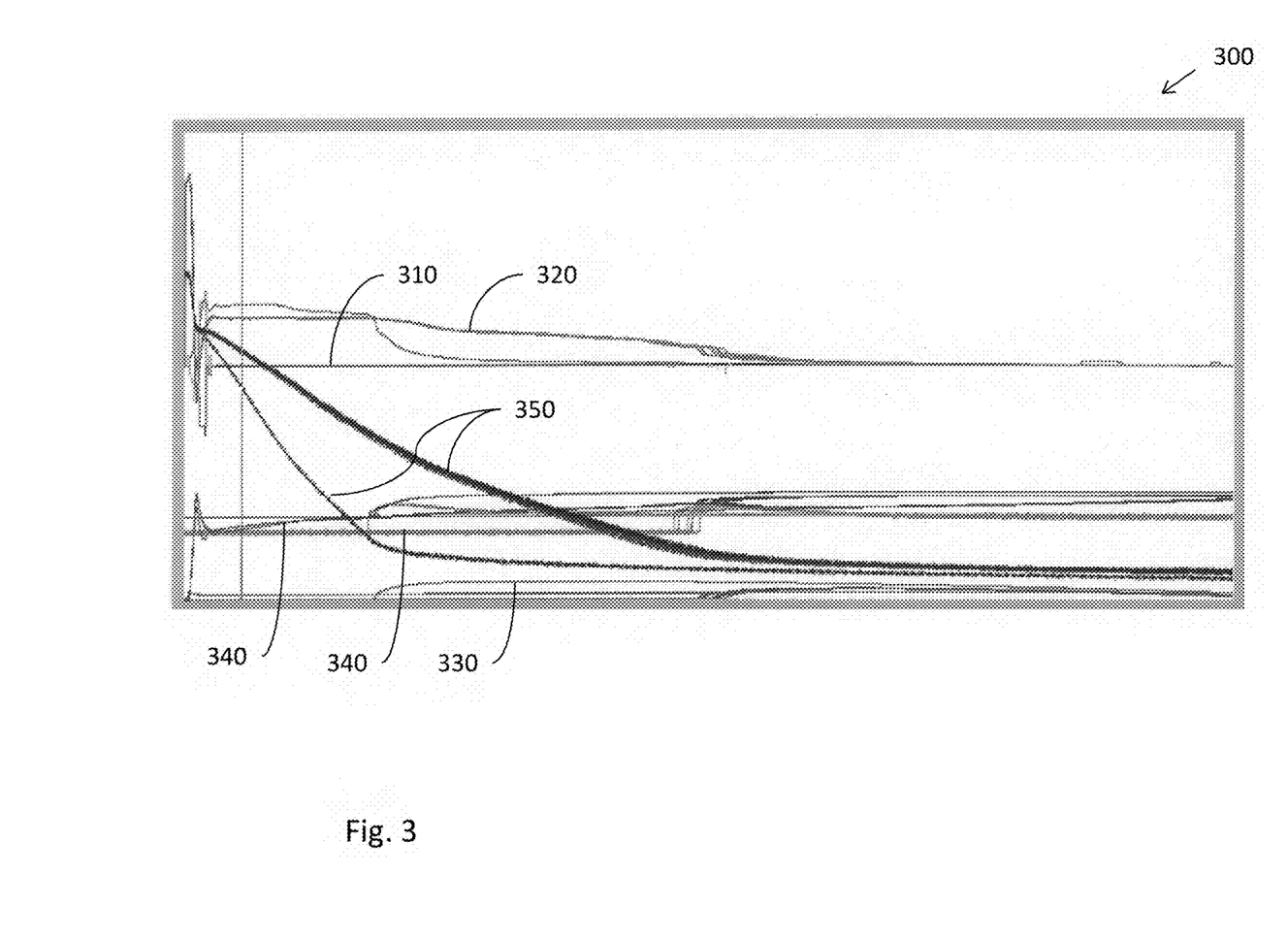
FIG. 3 is graph illustrating changes to molding parameters over time during an injection molding process.

FIG. 3 is graph 300 illustrating changes to molding parameters over time during an injection molding process using the injection molding device 100. Thus, many of the measured parameters experience large fluctuations at the beginning of the process, as the injection material passes from the large diameter portion 130 to the reduced diameter portion 140 of the gate 120, and then through the main passageway 150, the arms 160, and the exit nozzles 170. After the injection material begins to fill the molds 110 the measured parameters hold at a substantially constant rate, or change at a smoother rate. This particular graph 300 is an overlay of multiple runs of an injection molding process, in order to optimize the results. Changing one variable during the simulation will affect other variables. Thus, the overlays represent experimentation with different variables until the results are optimized.

The graph 300 may be generated in the context of a computer simulation of an injection molding process, or may be produced as a result of a physical injection molding process.

Line 310 represents the Internal Melt Pressure ("IMP") signal, which represents the pressure within the melt as result of mold resistance, partial solidification and air resistance during fill, pack and hold. This signal is computed from two real time measurements from physical sensors of melt pressure and temperature. The first sensor is located at the nozzle and the second sensor is located at the last place to fill in the cavity. The IMP signal is used as feedback for close loop control of injection. As can be seen in the simulation illustrated in FIG. 3, the IMP signal 310 initially drops as the injection molding device 100 is filled by the injection material, and then returns to its original state and remains at substantially the same level during the filling of the molds 110.

Line 320 represents the change in hydraulic injection pressure over time. The hydraulic injection pressure is the pressure generated by the driving mechanism. As can be seen in the simulation illustrated in FIG. 3, the hydraulic injection pressure 320 initially spikes as the injection material passes from the large diameter portion 130 to the reduced diameter portion 140 of the gate 120. The hydraulic injection pressure 320 then drops as the injection material begins to pass through the main passageway 150, then increases again as the injection material passes through arms 160 and the exit nozzles 170. The hydraulic injection pressure 320 then decreases as the molds 110 fill. As can be seen in this graph 300, the hydraulic injection pressure 320 dropped at different rates during different simulations, based on changes to other parameters.

Line 330 represents the change in cavity pressure, (i.e., the pressure inside of the molds 110) over time. As can be seen in the simulation illustrated in FIG. 3, the cavity pressure 330 is initially at zero while the injection molding device 100 is filled by the injection material, and the cavity remains empty. The cavity pressure 330 rises as the molds 110 begin to fill remains at substantially the same level during the filling of the molds 110.

Line 340 represents the change in melt pressure over time. The melt pressure is the pressure within the melt as result of mold resistance, partial solidification and air resistance during fill, pack and hold stages of injection. As can be seen in the simulation illustrated in FIG. 3, the melt pressure 340 initially spikes as the injection material passes from the large diameter portion 130 to the reduced diameter portion 140 of the gate 120. The melt pressure 320 then drops and gradually increases again as the injection material passes through the injection molding device 100 and fills the molds 110.

Line 350 shows the change in the position of the driving mechanism (i.e., the screw position) over time. As can be seen in the simulation illustrated in FIG. 3, the screw position 350 changes at a rapid pace initially, then changes at a slower pace until driving mechanism reached its end point. However, in some of the trials, the screw position 350 continued to change rapidly until the driving mechanism reached its end point. The results of these trials can be compared to determine the optimal screw velocity at various stages.

Line 360 shows the change in the cavity temperature over time. As can be seen in the simulation illustrated in FIG. 3, the screw position 350 changes at a rapid pace initially, then changes at a slower pace until driving mechanism reached its end point. However, in some of the trials, the screw position 350 continued to change rapidly until the driving mechanism reached its end point. The results of these trials can be compared to determine the optimal screw velocity at various stages.

Figure 4:
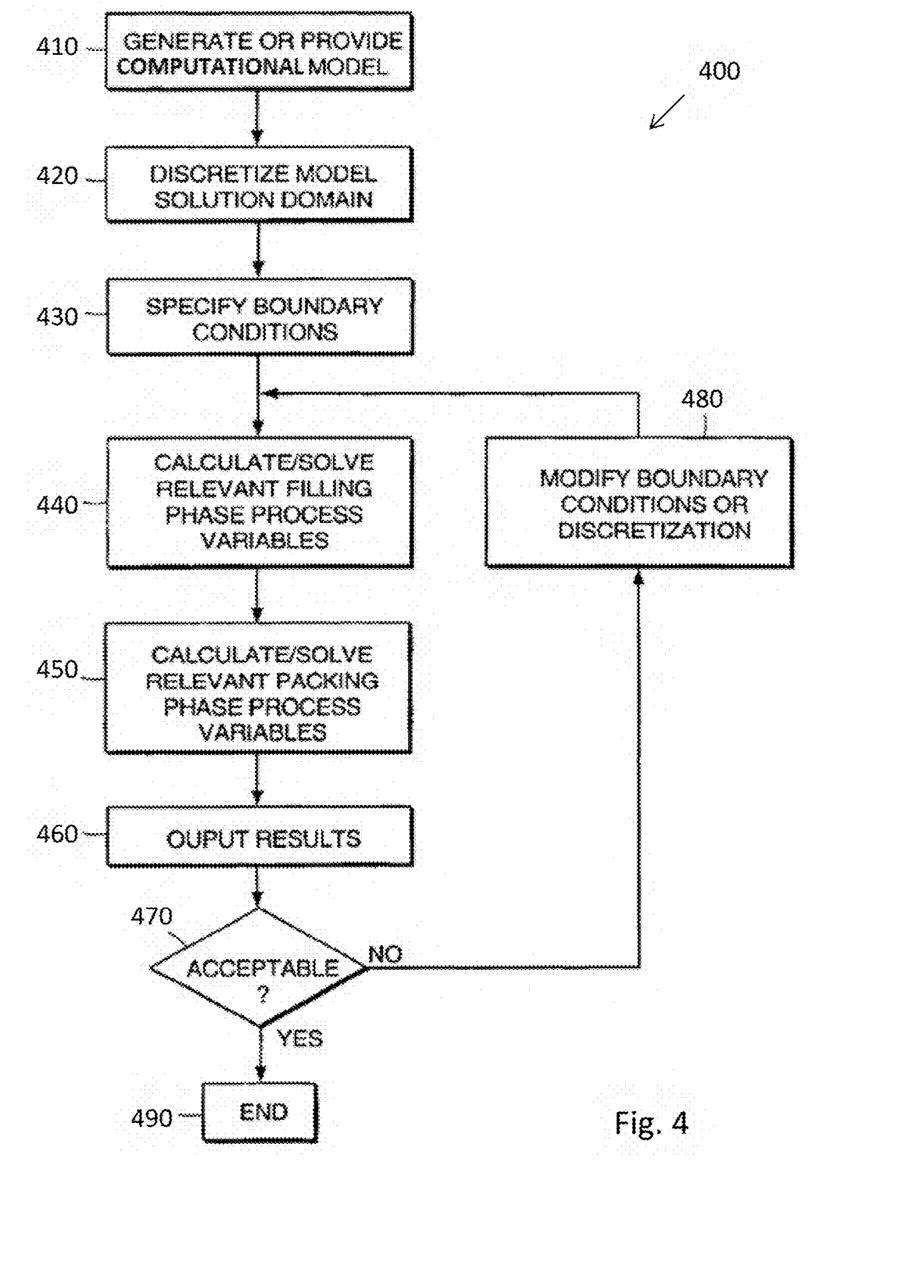
FIG. 4 is a flowchart illustrating certain process steps performed by a modeling system.

FIG. 4 is a schematic representation of one embodiment of a simplified, top level system flowchart 400 summarizing certain process steps of injection molding a part using the FEA run time data 230 and the process control 240. As a first step 410, a computational model of the injection molding device 100 and molds 110 are generated or provided, as discussed above. The model solution domain is then defined and discretized by any of a variety of methods, such as by finite element analysis in which a finite element model is produced by generating a finite element mesh based on the solid model in step 420. The mesh consists of a plurality of contiguous solid elements defined by shared nodes.

With the resultant finite element model or other discretized solution domain defined, a user specifies boundary conditions in step 430 for the analysis. The boundary conditions include the parameters 210 as well as the calculated parameters discussed above.

Once the boundary conditions have been entered, the multi-physics FEA executes the instructions in accordance with the simulation model to first calculate or solve relevant filling phase process variables in step 440. As discussed above, such variables can include fluidity, mold cavity fill time, pressure, shear rate, stress, velocity, viscosity, and temperature. Calculations are not limited to these variables; however these are basic variables that can be used to solve other variables included in calculations of such things as crystallization kinetics and fiber orientation distributions.

In this system, the multi-physics FEA is able to create melt characterization in real time using solvers. Notably, the system calculates volume as a function of time (V(t)) rather than simply measuring volume. The system characterizes melt from the beginning to the end of the process to examine the relationship between volume and flow. In one embodiment, the system employs volumetric solvers to calculate the volume filled in the cavity. Volumetric solvers require the solution of second order differential equations: $\iint_0'' f(x,y) d(x)$. By using such volumetric solvers, one is able to identify when a stopping point is reached.

Further, filling can also be solved as a compressible fluid, in which case mass terms included in the packing phase calculations (e.g. density, mass, and volumetric shrinkage) can also be calculated in the filling phase. According to one embodiment, the simulation can be based on the assumption that the fluid is incompressible in the filling phase and compressible in the packing phase. According to another embodiment, it can be assumed that the fluid is compressible in both the filling and packing phases. However, it is not mandatory to solve for fluidity before pressure, velocity, and viscosity, nor is it necessary to solve for fluidity at all.

Once the simulation reaches the stage in the analysis where it is determined that the mold cavity has been filled, the computer executes the instructions in accordance with the simulation model to next calculate or solve relevant packing phase process variables for the nodes in step 450. Such variables can include the mass properties of the component produced in accordance with the simulation model such as density and volumetric shrinkage, in addition to fluidity, packing time, pressure, shear rate, stress, velocity, viscosity, and temperature.

During the simulation, data is recorded at each of the sensor locations. Such data recordation may be referred to as data capture by the virtual sensors in the solid model. Specifically, the pressure, volume, and temperature are recorded at the sensor locations during the simulation, so that pressure, volume, and temperature curves can be created. The pressure, volume, and temperature curves can represent the change of pressure, volume, and temperature over time or the change of pressure, volume, and temperature per unit of displacement of the injection material.

Upon completion of the analysis, the analytical results may be output in step 460 in the form of graphs, such as the graph 300, or in any variety of manners. For example, the relevant variables may be displayed in a graphics format, overlaying the solid model for visual review by the user, or may be output electronically for further processing or analysis.

If the user determines that the results of the simulation in step 470 are unacceptable or less than optimal, the user has the option in step 480 of modifying one or more of the boundary conditions or discretization of the model solution domain and thereafter repeating simulation steps 440 through 460 iteratively, until such time as the user is satisfied with the results. Examples of unacceptable results include analytical instability of the model or process failures such as short shots, wherein the mold cavity is incompletely filled, or generation of excessive temperatures, velocities, or pressures during filling which could degrade component polymer material properties or introduce excessive residual stresses in the components which would adversely affect production yields and could lead to premature component failure. By providing this analytical simulation capability early in the design process, significant costs and delays downstream during initial production runs can be avoided.

If the results of the filling phase and the packing phase are deemed to be acceptable in step 470, the simulation terminates in step 490 and the user can proceed to release the design to manufacturing. Because the specified boundary conditions included information related to the configuration of the injection mold and the process parameters, the design can be released for machining of the injection mold and the injection molding process operation sheets generated directly. The pressure, volume, and temperature curves can also be released to an operator, for use with the physical mold during the molding process.

After the analytical results are deemed acceptable, and the design and pressure, volume, and temperature curves are released, a physical mold is built that has physical sensors at sensor locations corresponding to the sensor locations of the virtual sensors in the solid model. The physical sensors monitor the pressure, volume, and temperature at each sensor location. The physical mold also has a cavity and an injection nozzle configured to inject material into the cavity. The controller 240 is configured to control a flow rate of the injection of material into the cavity.

The controller 240 is configured to receive pressure, volume, and temperature information from the sensors. During a particular molding cycle, the controller 240 compares this received information to pressure, volume, and temperature curves. If the monitored pressure, volume, or temperature of the injection material deviates from the pressure, volume, and temperature curves by more than a predetermined amount, the controller 240 can adjust the flow rate of the injection material during the molding cycle. For example, the controller 240 can adjust the physical flow rate by adjusting at least one of a pressure, a screw velocity, and a temperature. The controller 240 may also control material melt by pressure, screw velocity, or a combination profile. The controller 240 and injection molding device 100 thus act as a "self-driving" injection molding device. So configured, the controller 240 may operate on an intracycle basis whereby changes may be made to the physical flow rate during a single molding cycle in an injection molding run.

Figure 5:
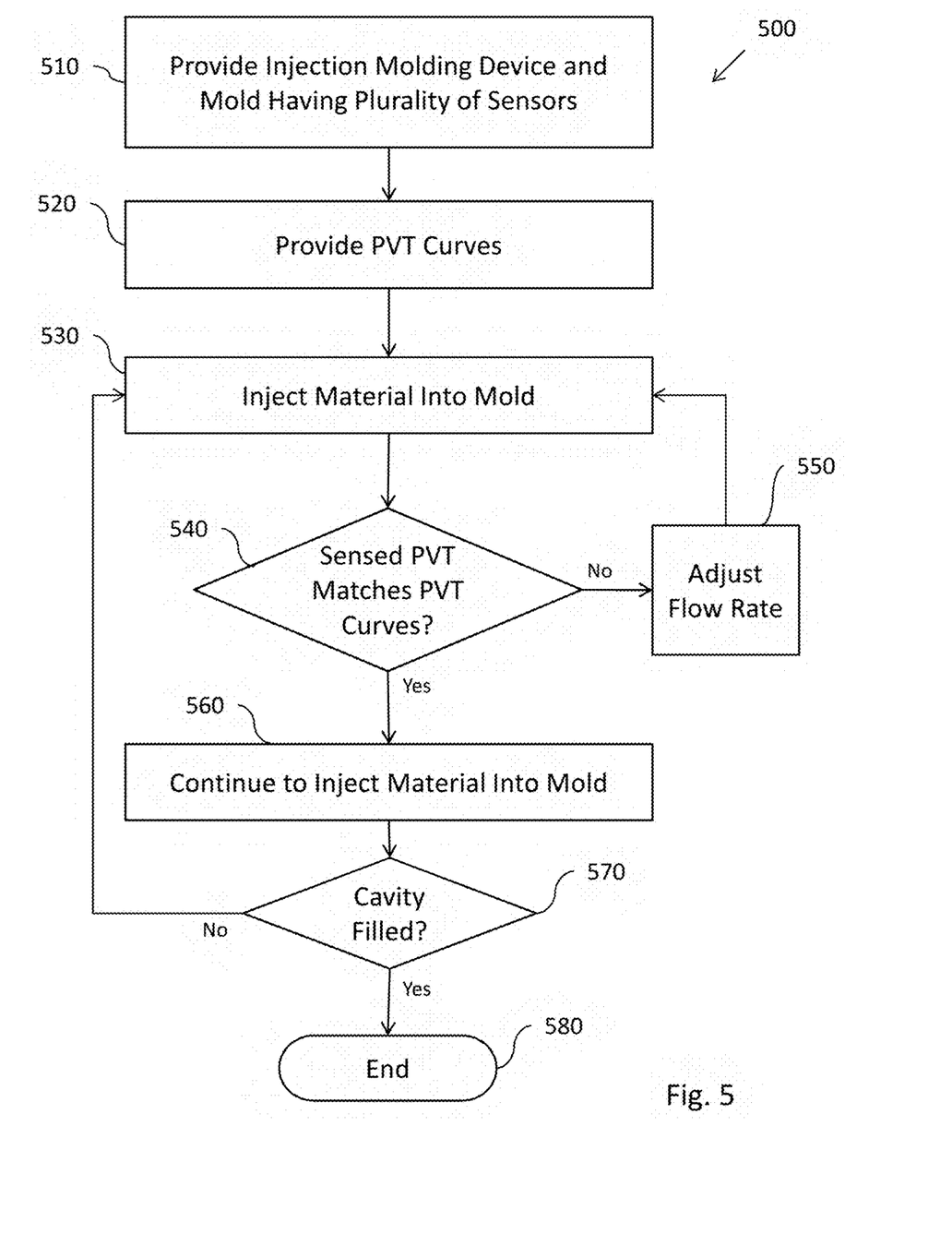
FIG. 5 is a flowchart illustrating certain steps of an injection molding process.

FIG. 5 is a flowchart illustrating a method 500 of molding an object using the pressure, volume, and temperature curves. At 510, a physical injection molding device (such as the injection molding device 100) and a physical mold (such as the molds 110) are provided. The mold has a plurality of physical sensors at sensor locations.

At 520, pressure, volume, and temperature curves are provided for a desired flow rate profile of an injection material at the sensor locations. At 530, injection material is injected into the physical mold at a physical flow rate corresponding to the desired flow rate profile.

The physical sensors continuously monitor the pressure, volume, and temperature of the injection material. If, during an injection molding cycle, the sensed pressure, volume and temperature does not match the pressure, volume temperature curves (at 540), the physical flow rate is adjusted (at 550), and material is continuously injected into the mold (at 530). The physical flow rate can be adjusted during the injection molding (i.e., on an intracycle basis), thereby allowing for changes to be immediately made to the injection cycle without the need to wait for a subsequent injection cycle. If the sensed pressure, volume and temperature does match the pressure, volume temperature curves (at 540), material is continuously injected into the mold (at 560) until the cavity is filled (at 570) and the process ends (at 580).

Compared to prior molding systems, the molding system 200 or other molding systems employing the method 500 may require fewer total sensors or fewer types of sensors. As explained above, the system employs solvers to calculate parameters in real time, based on the measured parameters of pressure, volume, and temperature that are continuously monitored by the physical sensors. Such parameters include, without limitation, the mass density of the injection material, the mass heat capacity of the injection material, the molar average heat capacity of the injection material, the molecular weight, the volume, the screw stroke, the relative viscosity, the absolute viscosity, the Reynold's number at a given location, the thermal conductivity of the injection material, the thermal diffusivity, the Prandtl at a given location, the relative shear, the relative shear rate, the melt flow index, the viscosity as a function of molecular weight, the viscosity as a function of shear, the mass as a function of shear rate, the determined stress as a function of position, the determined mass in the part as a function of position, the minimum and maximum polydispers in the part as a function of position, the theoretical cooling time, economics leading indicators, dynamic melt pressure, volumetric flow rate, bulk elastic modulus, flow velocity, Cauchy numbers, and density. The calculation of these parameters obviates the need for additional sensors. In other words, the use of solvers to calculate parameters allows for real time material and velocity control without the use of additional sensors.

As one example, the disclosed system and method may be employed to detect leaks in an injection molding system, without the use of strain gauges. Instead of using a strain gauges, the system predicts the weight and mass of the injection material in the mold in real time, as a function of the velocity. If a measured or an expected weight and mass do not meet the prediction, the controller signals to an operator that a leak is present. Such a leak detection system may be more reliable than the use of strain gauges or other leak detectors. It should be understood that systems may employ the above described leak detection method and other leak detection systems for the purpose of redundancy.

Figure 6:
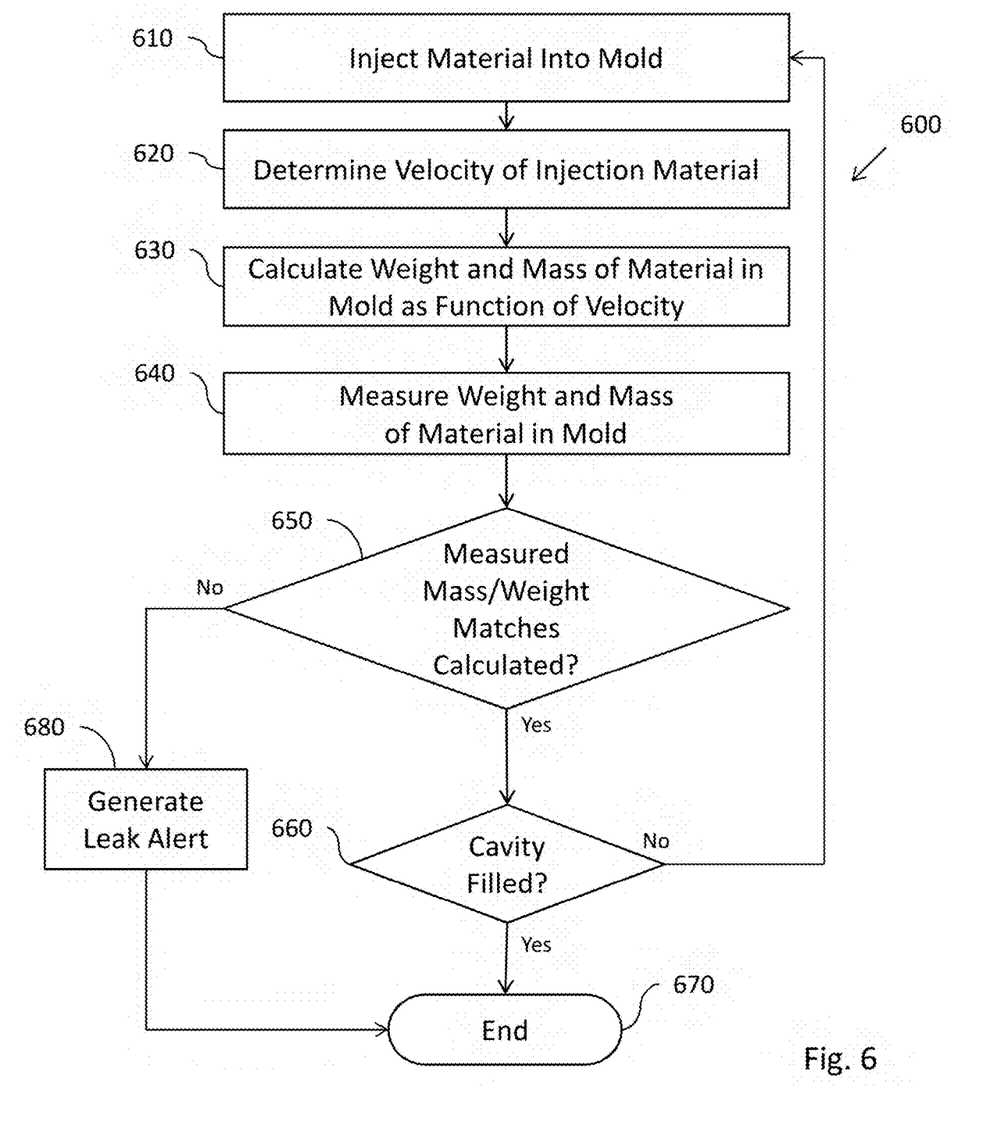
FIG. 6 is a flowchart illustrating a process for detecting a leak.

FIG. 6 is a flowchart illustrating such a process for detecting a leak. At 610, injection material is injected into an injection mold. At 620, a velocity of the injection material is determined. The velocity may be measured directly or it may be a calculated parameter based on the injection piston stroke per unit of time. Physical sensors continuously monitor other parameters of the injection material. From these monitored parameters, the system calculates the weight and mass of material in the mold as a function of the determined velocity and displaced volumes (at 630).

In one embodiment, the system calculates a weight and a mass of the material inside of the mold as a function of statistical processing of the pressure, volume, and temperature at the driving mechanism during injection of material. In addition or in the alternative, the system calculates a weight and a mass of the injection material inside of the injection mold as a function of statistical processing of a machine signal for injection forward at the driving mechanism during injection of material. Also in addition or in the alternative, the system calculates a weight and a mass of the injection material inside of the injection mold as a function of statistical processing of a Filling Index at the driving mechanism during injection of material. Also in addition or in the alternative, the system calculates a weight and a mass of the injection material inside of the injection mold as a function of statistical processing of a Viscosity Change Index at the driving mechanism during injection of material.

The system also measures the actual weight and mass of material in the mold (at 640). If the measured weight and mass match the calculated weight and mass (at 650) and the cavity is not yet filled (at 660), material continuous to be injected into the mold (at 610) and the measurements, calculations and determinations of steps 620-660 continue until the cavity is filled and the process ends (at 670). If, however, the measured weight and mass do not match the calculated weight and mass (at 650) the system generates a leak alert (at 680) and the process ends (at 670). Alternatively, the process may still continue after the leak alert is generated, until the cavity is filled.

Figure 7:
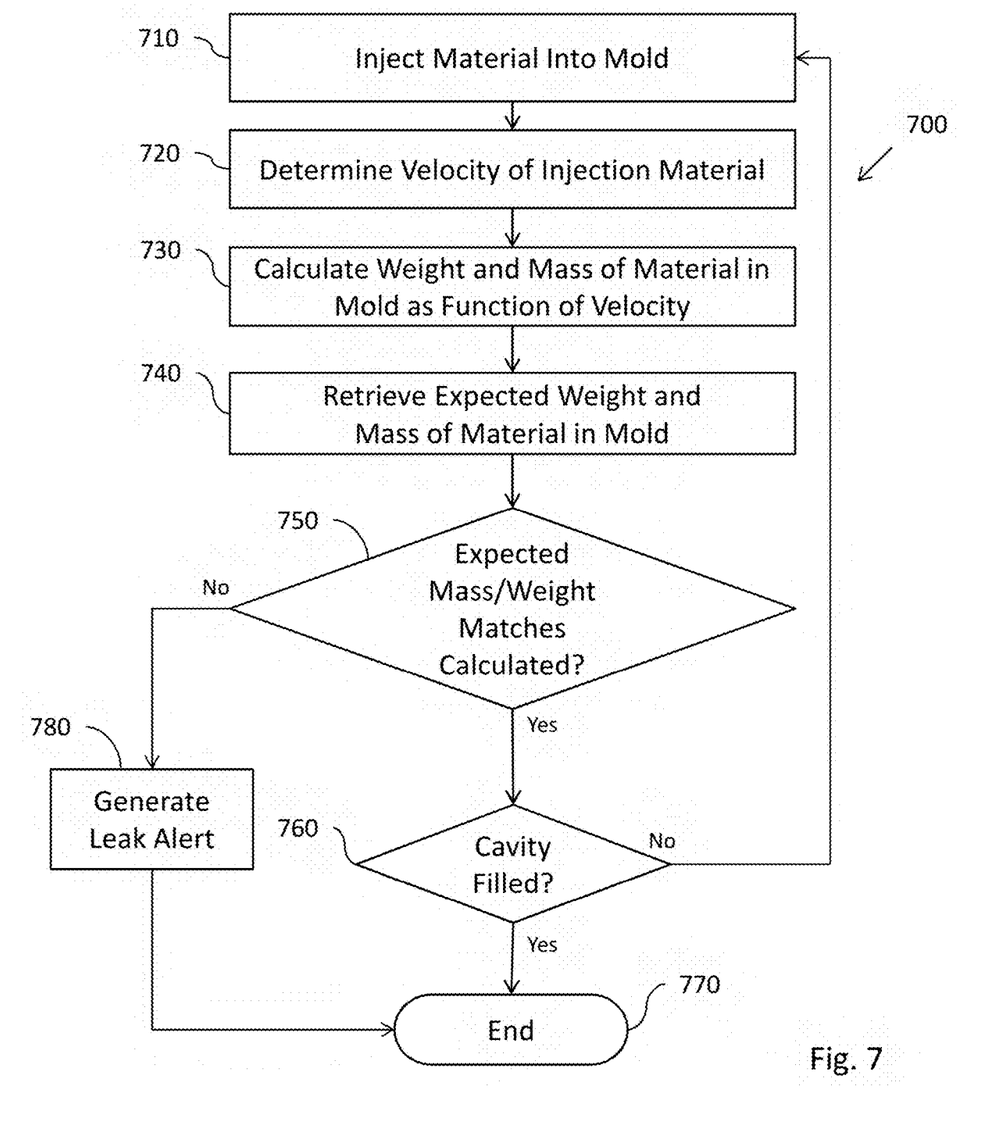
FIG. 7 is a flowchart illustrating an alternative process for detecting a leak.

FIG. 7 is a flowchart illustrating an alternative process for detecting a leak. At 710, injection material is injected into an injection mold. At 720, a velocity of the injection material is determined. The velocity may be measured directly or it may be a calculated parameter based on the piston stroke per unit of time. Physical sensors continuously monitor other parameters of the injection material. From these monitored parameters, the system calculates the weight and mass of material in the mold as a function of the determined velocity (at 730). The system also retrieves an expected weight and mass of material in the mold (at 740). The expected weight and mass corresponds to the stage of the injection molding process, and the values for each stage may be stored in a lookup table or other database. For example, the values may be stored in a machine learning database or a deep learning database. If the expected weight and mass match the calculated weight and mass (at 750) and the cavity is not yet filled (at 760), material continuous to be injected into the mold (at 710) and the measurements, calculations and determinations of steps 720-760 continue until the cavity is filled and the process ends (at 770). If, however, the expected weight and mass do not match the calculated weight and mass (at 650) the system generates a leak alert (at 680) and the process ends (at 670). Alternatively, the process may still continue after the leak alert is generated, until the cavity is filled.

In one embodiment, the system may be configured to generate an alert only when the leakage is determined to be above a predetermined threshold. For example, an operator may determine that a leakage rate of 1-2% is acceptable, but that a leakage rate of 3-4% requires repair. The predetermined threshold may be determined by any number of factors including economic factors related to the cost of material and the cost of repair, as well as effect of a leak on the quality of a finished product and the urgency of a given production run.

In some instances, if a leaking machine can perform effectively to produce molded articles, it may be more cost effective to continue to use a leaking machine rather than shutting a machine down for an extended period of time to perform repair. In some instances, a leakage rate upwards of 25% may be acceptable. For the leaking machine to perform effectively, it must be able to determine when the cavity has been filled with the injection material.

In such an embodiment, a plurality of sensors in the injection molding machine sense a pressure, volume, and temperature of the injection material at one or more sensor locations. For example, sensors may sense the pressure, volume, and temperature of the injection material at a reciprocating screw or other driving mechanism. A processor then calculates a weight and a mass of the injection material inside of the cavity during an injection process as a function of information received from the plurality of sensors. A controller adjusts a speed of the driving mechanism according to the calculated weight and mass of the injection material. The processor continues to calculate the weight and mass as a function of information received from the plurality of sensors, until it determines that the cavity has been filled by the injection material based on the calculated weight and mass of the injection material. The controller then stops the driving mechanism upon determining that the cavity has been filled.

In addition or in the alternative to calculating weight and mass based on the pressure, volume and temperature measurements, the processor may calculate a weight and a mass of the injection material inside of the injection mold as a function of statistical processing of a machine signal for injection forward at the driving mechanism during injection of material. Alternatively, or in addition to one or more of these calculations, the processor may calculate a weight and a mass of the injection material inside of the injection mold as a function of statistical processing of a Filling Index at the driving mechanism during injection of material. As another addition or alternative, the processor may calculate a weight and a mass of the injection material inside of the injection mold as a function of statistical processing of a Viscosity Change Index at the driving mechanism during injection of material.

In other embodiments, additional sensors may be eliminated or used as a redundancy to detectors relying on calculated parameters. More generally, the system provides real time control without the use of sensors.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A system comprising:
   a cavity;
   an injection nozzle configured to inject material into the cavity;
   a plurality of physical sensors at sensor locations, wherein each of the plurality of sensors is configured to measure parameters at one of the sensor locations during a first molding cycle, and wherein the system calculates the weight and mass of the injected material in the cavity with statistical methods of controls that correlate machine variables with material and melt variables, and wherein the system measures the actual weight and mass of injected material in the mold;
   a controller configured to control a flow rate of injection of material into the cavity,
      wherein the controller is configured to receive the measured parameters and compare the measured parameter to predetermined curves during the first molding cycle, and
      wherein during the first molding cycle, the controller is configured to adjust the flow rate when the measured parameters deviate from the predetermined curves determining if the measured weight and mass match the calculated weight and mass; and detecting a leak if the measured weight and mass do not match the calculated weight and mass.

2. The system of claim 1, further comprising a processor configured to create the predetermined curves through finite element analysis ("FEA") calculations.

3. The system of claim 2, wherein the processor is configured to perform the FEA calculations on an FEA model of a mold.

4. The system of claim 3, wherein the FEA model of the mold includes virtual sensors at locations corresponding to the sensor locations.

5. The system of claim 1, further comprising a processor configured to calculate a weight of the material inside the cavity as a function of statistical processing of one of a machine signal for injection forward, a Filling Index, and a Viscosity Change Index.

6. The system of claim 1, further comprising a processor configured to calculate a mass of the material inside the cavity as a function of statistical processing of one of a machine signal for injection forward, a Filling Index, and a Viscosity Change Index.

7. The system of claim 1, wherein the controller is configured to control at least one of a pressure, a screw velocity, and a temperature.

8. The system of claim 1, wherein the controller is configured to control material melt by pressure, screw velocity, or a combination profile.

* * * * *